United States Patent Office 3,192,197
Patented June 29, 1965

3,192,197
3 - (SUBSTITUTED)SULPHONYL - 5 - ALKANOYL-IMINODIBENZYLS USEFUL IN THE PREPARATION OF DERIVATIVES OF DIBENZ[b,f]AZEPINES
Henri Dietrich and Werner Küng, Basel, Switzerland, assignors to Geigy Chemical Corporation, Ardsley, N.Y., a corporation of Delaware
No Drawing. Filed Apr. 6, 1962, Ser. No. 185,519
Claims priority, application Switzerland, Apr. 8, 1961, 4,159/61, 4,160/61
6 Claims. (Cl. 260—239)

The present invention concerns novel intermediates for the preparation of new N-heterocyclic compounds which have valuable pharmacological properties.

More specifically, the invention relates to intermediates useful in the preparation of new derivatives of dibenz[b,f] azepines, namely iminodibenzyl derivatives substituted by a disubstituted sulphamoyl group, i.e. compounds of the Formula I

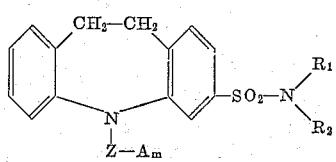

wherein
$R_1$ and $R_2$ represent lower alkyl radicals which can be bound to each other direct or by way of an oxygen atom,
Z represents a straight chained or branched chained alkylene radical having 2–6 carbon atoms, and
Am represents a lower alkylamino or di(lower)alkylamino group and wherein a lower alkyl radical of Am can be bound direct with the alkylene radical Z or both lower alkyl radicals of a di(lower)alkylamino group Am can be found to each other direct or by way of an oxygen atom, an imino group, a lower alkylimino, hydroxy (lower)alkylimino or lower alkanoyloxy(lower)alkylimino group as well as their non-toxic acid addition salts, which compounds have valuable pharmacological properties, for example spasmolytic, antiallergic, antiemetic, serotonin-antagonistic and reserpine-antagonistic activity. In addition they modify the action of other pharmaceuticals, in particular, of anaesthetics e.g. 2-methoxy-4-allylphenoxyacetic acid diethylamide.

In the compounds of the Formula I, the term "lower" means radicals having from 1 to at most 4 carbon atoms, e.g. methyl, ethyl, propyl, isopropyl etc. Therein $R_1$ and $R_2$ represent, for example, methyl, ethyl, n-propyl or n-butyl radicals or, together with the adjacent nitrogen atom, they form, for example, the 1-pyrrolidinyl, piperidino or 4-morpholinyl radical. Z is, for example, an ethylene, propylene, trimethylene, 1-methyl-trimethylene, 2-methyl-trimethylene or tetramethylene radical and Am is, for example, a methylamino, ethylamino, n-propylamino, isopropylamino, n-butylamino, dimethylamino, methylethylamino, diethylamino, methyl-n-propylamino, methyl-isopropylamino, di-n-butylamino, diisobutylamino, 1-pyrrolidinyl, piperidino, hexamethyleneimino, 4-morpholinyl, 1-piperazinyl, 4-methyl-1-piperazinyl, 4-isopropyl-1-piperazinyl, 4-(β-hydroxyethyl)-1-piperazinyl, 4-(β-acetoxy-ethyl)-1-piperazinyl or 4-β-hydroxypropyl-1-piperazinyl radical. In addition, Am together with Z can represent, e.g. the β-(1-methyl-2-pyrrolidinyl)-ethyl, 1-methyl-3-pyrrolidinylmethyl, β-(1-methyl-2-piperidinyl)-ethyl, 1-methyl-3-piperidinylmethyl or 1-methyl-4-piperidinyl radical.

Compounds I are disclosed and claimed in a copending application.

One process for the production of compounds of the Formula I consists in reacting, in the presence of a basic condensing agent, a compound of the Formula V

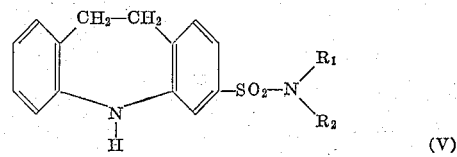

(V)

wherein $R_1$ and $R_2$ have the meanings given above, with a reactive ester of an aminoalcohol of the Formula VI, $$HO-Z-Am_2 \qquad (VI)$$

wherein
$Am_2$ has the meaning given above for Am with the exception of a lower alkylamino group, and
Z has the meaning given above.

Examples of starting materials of the Formula V are 3-dimethylsulphamoyl-iminodibenzyl, 3 - diethylsulphamoyl - iminodibenzyl, 3-piperidinosulphonyl - iminodibenzyl and 3-(4'-morpholinyl)-sulphonyl-iminodibenzyl. These and other homologous and isomeric compounds are obtained, e.g. starting from 3-amino-5-acetyl-iminodibenzyl by converting this into the corresponding diazonium chloride and treating the latter, in acetic acid after addition of copper-II-chloride, with sulphur dioxide, precipitating the 3-chlorosulphonyl-5-acetyl-iminodibenzyl by dilution with water and reacting with a suitable lower dialkylamine, with piperidine or morpholine and, finally, splitting off the acetyl radical by partial hydrolysis by means of ethanolic or methanolic potassium hydroxide solution.

As reactive esters of aminoalcohols of the Formula VI, the halides in particular are employed, as e.g. the chlorides, bromides or iodides; individually can be named:

β-dimethylamino-ethyl chloride,
β-diethylamino-ethyl chloride,
β-methylethylamino-ethyl chloride,
β-dimethylamino-propyl chloride,
β-dimethylamino-isopropyl chloride,
γ-dimethylamino-propyl chloride,
γ-dimethylamino-butyl chloride,
δ-dimethylamino-butyl chloride,
γ-dimethylamino-β-methyl-propyl chloride,
α-methyl-γ-dimethylamino-n-amyl chloride,
β-(di-n-propylamino)-ethyl chloride,
β-(methyl-isopropylamino)-ethyl chloride,
β-(di-n-butylamino)-ethyl chloride,
β-(diisobutylamino)-ethyl chloride,
β-(1-pyrrolidinyl)-ethyl chloride,
β-piperidino-ethyl chloride,
γ-(1-pyrrolidinyl)-propyl chloride,
γ-piperidino-propyl chloride,
β-(4-morpholinyl)-ethyl chloride,
γ-(4-morpholinyl)-propyl chloride,
β-(4-methyl-1-piperazinyl)-ethyl chloride,
γ-(4-methyl-1-piperazinyl)-propyl chloride,
β-[4-(β-acetoxy-ethyl)-1-piperazinyl]-ethyl chloride,
γ-[4-(β-acetoxy-ethyl)-1-piperazinyl]-propyl chloride,
β-(1-methyl-2-pyrrolidinyl)-ethyl chloride,
β-(1-methyl-2-piperidyl)-ethyl chloride and
(1-methyl-3-piperidyl)-methyl chloride, as well as the corresponding bromides and iodides, as well as the corresponding alkane- and arysulphonic acid esters.

The following example further illustrates the production of new compounds of Formula I. Parts are given therein as parts by weight and their relationship to parts by volume is as that of grammes to cubic centimetres. The temperatures are in degrees centigrade.

Example 1

30.2 parts of 3-dimethylsulphamoyl-iminodibenzyl are dissolved in 900 parts by volume of abs. xylene, 4.3 parts of sodium amide pulverised in toluene are added and the whole is stirred for 2½ hours at 120°. γ-Dimethylamino-propyl chloride (liberated from 16 parts of the hydrochloride and taken up in xylene) is added and the whole is refluxed for 19 hours. After cooling, the reaction mixture is extracted with 2 N hydrochloric acid, the reaction product is then liberated with 5 N caustic soda lye and taken up in ether. After drying the solution and evaporation off of the ether, an oil remains which, on standing for a considerable time, crystallises. Recrystallised from petroleum ether, the pure 3-dimethylsulphamoyl-5-(γ-dimethylamino-propyl) - iminodibenzyl melts at 66–68°.

With γ-diethlamino-propyl chloride in the place of γ-dimethylamino propyl chloride, 3-dimethylsulphamoyl-5-(γ-diethylamino-propyl)-iminodibenzyl is obtained in a similar manner.

3-piperidinosulphonyl - 5-dimethylamino-propyl-iminodibenzyl is obtained in an analogous manner from 3-piperidinosulphonyl - imino - dibenzyl and γ-dimethylamino-propyl chloride. Recrystallised from cyclohexane, it melts at 109°.

3-(4'-morpholinyl) - sulphonyl - 5-(γ-dimethylamino-propyl)-imino-dibenzyl, produced analogously to the above example from 3-(4'-morpholinyl)-sulphonyl imino-dibenzyl and dimethylamino-propyl chloride, melts at 132–133°. The hydrochloride melts at 201–203°.

3-diethylsulphamoyl - 5-(γ-dimethylamino-propyl)-iminodibenzyl is obtained in an analogous manner from 3-diethylsulphamoyl-iminodibenzyl and γ-dimethylamino-propyl chloride.

In analogous manner from 3-(4'-morpholinyl-)-sulphonyl-iminodibenzyl and N-methyl piperidyl-2-ethyl chloride, 3-(4'-morpholinyl)-sulphonyl-5-N-methyl-piperidyl-2-ethyl-iminodibenzyl is obtained. Its hydrochloride retains 1 mol of crystal water and melts at 211–212.5°.

The 3-piperidinosulphonyl - 5-(N-methylpiperidinyl-2'-ethyl)-iminodibenzyl hydrochloride monohydrate, produced in an analogous manner, melts at 165–167°.

In its principal aspect, this invention relates to the new intermediate products, corresponding to subsequent Formulae IX, X and XII, for the preparation of substances having valuable pharmacological properties as described in the preceding portion of this disclosure. New compounds, which can be used also as antioxidants, and which are illustrated by Formula XII and the following Formula IX (corresponding to Formula V)

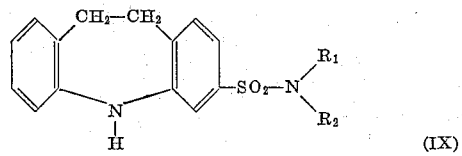

wherein $R_1$ and $R_2$ independently represent lower alkyl radicals which can be bound to each other direct or by way of an oxygen atom, can be prepared by converting a 3-amino-5-acyl-iminodibenzyl, particularly 3-amino-5-acetyl-iminobenzyl, into the corresponding diazonium chloride, treating the latter with sulphur dioxide to form the new intermediate chlorosulphonyl compound of the Formula X

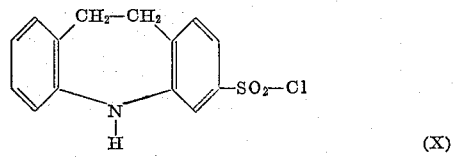

wherein R represents an acyl radical, e.g. the acetyl radical or another lower alkanoyl radical, and reacting the chlorosulphonyl compound (Formula X) with an amine of the general Formula XI

wherein $R_1$ and $R_2$ have the meanings given above, and partially hydrolysing the new compound formed of the Formula XII

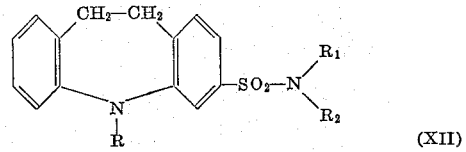

i.e. while retaining the sulphonamido group to the compound of the Formula IX.

In the compounds of the Formula IX and the starting and intermediate products (of the Formulae X, XI and XII) for the production of same. The term "lower" means radicals having from 1 to at most 4 carbon atoms, e.g. methyl, ethyl, propyl, isopropyl etc. Each of $R_1$ and $R_2$ independently represents, for example, methyl, ethyl, n-propyl, isopropyl, n-butyl or isobutyl radicals. Together with the adjacent nitrogen atom they can represent, e.g. a pyrrolidinyl-(1), piperidino or 4-morpholinyl radical. The acyl radical R in Formulae X and XII is preferably an acetyl radical, but it can also be another lower alkanoyl radical such as the propionyl or butyryl radical or a lower carbalkoxy radical.

To convert the 3-amino-5-acyl-aminodibenzyls into 3-chlorosulphonyl-iminodibenzyls, first the corresponding diazonium chloride solutions are prepared in the usual way, and these are poured into glacial acetic acid to which copper-II-chloride has been added and which has been saturated with sulphur dioxide. Sulphur dioxide is then introduced until no more nitrogen is liberated. The chlorosulphonyl compounds of the Formula X can be liberated, e.g. by dilution of the reaction mixtures with ice and water. The reaction with amines of the Formula XI is preferably performed in an inert organic solvent such as, e.g. acetone, at room temperature (about 20° C.) to boiling temperature. The amines to be reacted can be added, e.g. as such or as concentrated aqueous solutions. Advantageously an excess of amine serves as acid binding agent. The 3-sulphamoyl-5-acyl-iminodibenzyls are partially hydrolysed advantageously in an alkaline medium, e.g. with ethanolic or methanolic potassium or sodium hydroxide solution.

Compounds produced according to this aspect of the invention and corresponding to those of Formula IX can be reacted, for example in the presence of sodium amide in an inert organic solvent, with for example lower dialkylamino alkyl chlorides such as γ-dimethylamino propyl chloride to form the corresponding 5-dialkyl-amino alkyl derivatives particularly useful on account of their serotonin- and reserpine-antagonistic properties; with for example γ-dimethylamino butyl chloride or β-(1'-methyl-2'-piperidinyl)-ethyl chloride to form derivatives of interest in particular because of their spasmolytic properties, for example with lower α,ω-dihalo alkanes, followed by 1-lower alkyl- or 1-(hydroxyloweralkyl)-piperazine to form piperazinyl derivatives of particular value because of their antiemetic properties.

Particularly advantageous intermediate compounds according to this second aspect of the invention are compounds of the formulae

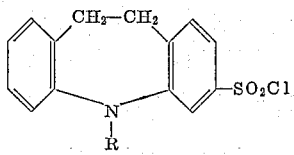

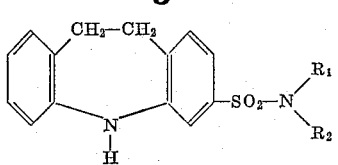

and

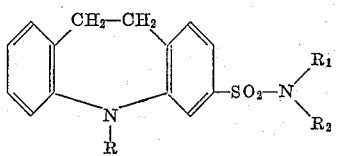

wherein

R₁ and R₂ are independently lower alkyl, and
R₁ and R₂ when taken together with the adjacent nitrogen represent piperidino and 4-morpholinyl, and
R is acyl, preferably acetyl.

The following example further illustrates the production of new compounds of Formulae IX, X and XII according to this aspect, but is by no means the sole method of performing the process according to the invention. Parts are given therein as parts by weight; their relationship to parts by volume is as that of grammes to cubic centimeters. The temperatures are in degrees centigrade.

*Example 2*

(a) 25.2 parts of 3-amino-5-acetyl-iminodibenzyl are dissolved in 50 parts by volume of concentrated hydrochloric acid and 150 parts by volume of water. On cooling and stirring, the hydrochloride crystallises out in a fine form. 7 parts of solid sodium nitrite are added to the ice-cooled suspension which is then stirred until a clear solution is obtained. The solution is then added to 500 parts by volume of glacial acetic acid to which have been added 3 parts of copper-(II)-chloride and which has been saturated with sulphur dioxide. Nitrogen development begins immediately and, on continuously introducing sulphur dioxide, is concluded after about 1 hour. The reaction mixture is diluted with ice and water whereupon the chlorosulphonyl compound crystallises and can be filtered off. The crude product is purified by dissolving in benzene and precipitating with petroleum ether or by recrystallising from a little benzene. The 3-chlorosulphonyl-5-acetyl-iminodibenzyl then melts at 173.5–174°.

(b) 33.58 parts of 3-chlorosulphonyl-5-acetyl-iminodibenzyl are dissolved in 200 parts by volume of acetone and 200 parts by volume of 40% aqueous dimethylamine solution are added. On heating for a short time at 55° and then concentrating, a crystal slurry is obtained to which water is added. The crystals are filtered off under suction and recrystallised from ethanol. The 3-dimethyl-sulphamoyl-5-acetyl-iminodibenzyl melts at 151°.

(c) 34.4 parts of 3-dimethylsulphamoyl-5-acetyl-iminodibenzyl and 20 parts of potassium hydroxide in 300 parts by volume of alcohol are refluxed for 8 hours. After concentrating and diluting with ice water, the crude product can be filtered off. Recrystallised from ethanol, the pure 3-dimethylsulphanomyl-iminodibenzyl melts at 140°.

The following compounds, for example, are produced by reaction with the corresponding amine in an analogous manner:

3-diethylsulphamoyl-5-acetyl-iminodibenzyl, M.P. 136°,
3-diethylsulphamoyl-iminodibenzyl, M.P. 174°,
3-piperidino-sulphonyl - 5 - aceteyl - iminodibenzyl, M.P. 145–146°,
3-piperidinosulphonyl-iminodibenzyl, M.P. 244°,
3-(4'-morpholinyl)-sulphonyl - 5 - acetyl - iminodibenzyl, M.P. 196°,
3 - (4' - morpholinyl) - sulphonyl - iminodibenzyl, M.P. 211–212°,
3-methylethylsulphamoyl-5-acetyl-iminodibenzyl, and
3-methylethylsulphamoyl-iminodibenzyl.

What is claimed is:
1. 3-(4'-morpholinyl)-sulphonyl-iminodibenzyl.
2. An iminodibenzyl of the formula

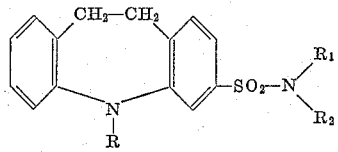

in which
R₁ and R₂ are independently lower alkyl and R₁ and R₂ when taken together with the adjacent nitrogen is a member selected from the group consisting of piperidino and 4-morpholinyl, and
R is lower alkanoyl.
3. 3-piperidinosulphonyl-5-acetyl-iminodibenzyl.
4. 3-(4'-morpholinyl) - sulphonyl - 5 - acetyl - iminodibenzyl.
5. An iminodibenzyl of the formula

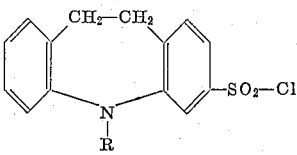

in which R is lower alkanoyl.
6. 3-chlorosulphonyl-5-acetyl-iminodibenzyl.

References Cited by the Examiner

UNITED STATES PATENTS

| | | | |
|---|---|---|---|
| 2,554,736 | 5/51 | Haefliger et al. | 260—239 |
| 2,894,947 | 7/59 | Jacob et al. | 260—243 |
| 2,928,767 | 3/60 | Gulesich et al. | 260—243 |
| 2,981,736 | 4/61 | Gailliot et al. | 260—239 |
| 3,016,373 | 1/62 | Saggiomo et al. | 260—239 |

OTHER REFERENCES

Hollister: Ann. of Internal Medicine, volume 51, No. 5, pages 1040–41 (1959).
Lehmann et al.: Canadian Psychiatric Assoc. Jour., volume 3, No. 4, pages 155–63 (1958).
Schindler et al.: Helv. Chim. Acta, volume 37, 1954, pages 472–83.
Villani et al.: Jour. of Med. and Pharm. Chem., volume 5, No. 2, pages 373–83 (1962).

IRVING MARCUS, *Primary Examiner.*
WALTER A. MODANCE, *Examiner.*